US006322839B1

(12) United States Patent
Schade

(10) Patent No.: US 6,322,839 B1
(45) Date of Patent: Nov. 27, 2001

(54) PSYLLIUM ENRICHED PASTA PRODUCTS AND METHOD FOR MAKING SAME

(75) Inventor: Hans R. Schade, Galesburg, MI (US)

(73) Assignee: Kellogg Company, Battle Creek, MI (US)

( * ) Notice: Subject to any disclaimer, the term of this patent is extended or adjusted under 35 U.S.C. 154(b) by 0 days.

(21) Appl. No.: 09/434,795

(22) Filed: Nov. 5, 1999

Related U.S. Application Data

(60) Provisional application No. 60/107,280, filed on Nov. 5, 1998.

(51) Int. Cl.[7] ........................................................ A21D 2/36
(52) U.S. Cl. .............................................................. 426/557
(58) Field of Search ................................... 426/557, 549, 426/615, 622, 629, 653, 3

(56) References Cited

U.S. PATENT DOCUMENTS

| | | | | |
|---|---|---|---|---|
| 5,224,655 | * | 7/1993 | Barbera et al. | 241/9 |
| 5,384,144 | * | 1/1995 | Bedard et al. | 426/557 |
| 5,955,123 | * | 9/1999 | Daggy | 426/21 |

* cited by examiner

*Primary Examiner*—Keith Hendricks
(74) *Attorney, Agent, or Firm*—Howard & Howard

(57) ABSTRACT

Psyllium enriched pasta products made with ultra-fine psyllium and methods for their preparation are disclosed.

5 Claims, No Drawings

PSYLLIUM ENRICHED PASTA PRODUCTS AND METHOD FOR MAKING SAME

This application claims priority to provisional application No. 60/107,280, filed Nov. 5, 1998.

FIELD OF THE INVENTION

This invention relates to psyllium-enriched pasta products. The pasta products may be administered to humans and animals susceptible to or afflicted with hypercholesterolemia to lower serum cholesterol or to individuals in need of dietary regulation. The invention also relates to the production of the pasta products, in which raw psyllium is incorporated into the pasta product.

BACKGROUND OF THE INVENTION

Psyllium is a known mucilaginous material which has found extensive use in bulk laxatives. The source of psyllium is the seeds of plants of the Plantago genus, which grow in certain sub-tropical regions. Since it is believed by those skilled in the art that the active ingredient of psyllium is the psyllium seed gum, which is located primarily in the seed husk, present technology uses the ground seed husk as the source of psyllium. However, the whole seed is also known as a psyllium source, as well as the dehusked psyllium seed.

It is well known that psyllium decreases plasma triglycerides and LDL cholesterol, particularly in humans. The specific use of a psyllium hydrophilic mucilloid to lower cholesterol in serum was documented by Anderson et al., Arch. Intern. Med. Vol. 148, February 1988, 292–296 (1988), Anderson et al., Am. J. Clin Nutr. Vol.56, p. 93–98, (July 1992). It has been theorized that psyllium, which belongs to a class of gel forming soluble fibers, disrupts the absorption or metabolism of cholesterol by binding, entrapping, absorbing, or otherwise interfering with the reabsorption of bile acids across the intestinal lumen. It is also theorized that the soluble fiber interferes with the intraluminal formation of micelles, resulting in decreased cholesterol and bile acid reabsorption. The end result is that more bile acids and dietary cholesterol are ultimately excreted in the feces, resulting in a decreased level of serum cholesterol.

However, due to its mucilaginous nature, psyllium acquires a slimy or adhesive texture and mouthfeel upon hydration. Psyllium normally forms a gelatinous mass when contacted with water and exhibits poor dispensability and mixability in water. Psyllium also develops a distinctive, undesirable flavor in the presence of heat and moisture which further limits its use in food products. This slimy mouthfeel is unpalatable and, accordingly, various additives have been incorporated in psyllium-containing ingestible compositions in order to mask the undesirable texture and mouthfeel of the psyllium.

Notwithstanding the undesirable flavor and texture imparted to an ingestible composition by psyllium or psyllium husks, various psyllium-containing foodstuffs have been proposed which purport to take advantage of the natural digestion regulation properties of psyllium, or the satiating or "fullness-feeling" effect of psyllium. See, for example, U.S. Pat. Nos. 3,574,634 and 4,348,379.

In addition, it has been suggested, for example, in U.S. Pat. No. 3,148,114, that whole psyllium husks, such as the ground husks of the seed of Plantago psyllium, lower blood cholesterol upon oral administration thereof. Further, it has also long been known to use small quantities of psyllium, such as less than 1%, as a thickener in foodstuffs, such as in the ice cream, puddings and the like.

Attempts have been made to incorporate psyllium into foodstuffs, so that the fiber can be consumed as part of a regular meal of other aspect of a normal diet, without any connotation or association with medicines, as well as with acceptable organoleptic properties. Examples of the patent literature involving psyllium incorporated into foodstuffs are U.S. Pat. Nos. 5,223,298 and 5,227,248, both of which are incorporated by reference. These patents teach psyllium containing ready to eat cereals. Additional examples of cereals containing psyllium are set forth by Moskowitz, U.S. Pat. No. 4,766,004; Ringe U.S. Pat. No. 5,024,996; and Ringe et al., U.S. Pat. No. 5,026,689. Other foodstuffs which include psyllium are taught in U.S. Pat. Nos. 5,095,008 and 5,950,140 both of which teach cookies with incorporated psyllium. U.S. Pat. No. 5,015,486 teaches microwaveable muffins, and U.S. Pat. No. 5,024,996 which teaches almond paste containing compositions, such as marzipan. U.S. Pat. No. 5,164,216 discloses bread suitable for microwaving which contain required levels of shortening and fiber. Psyllium mucilloid is mentioned as a potentially useful fiber source; however, no examples of its use are given, nor is there any discussion of problems associated therewith. While it is clearly desirable to incorporate psyllium into food products, the mucilaginous nature of the material render normal preparation processes unsuitable for use.

A variety of psyllium containing foodstuffs have been prepared including such as pastas. Pastas prepared from prewetted psyllium are disclosed in U.S. Pat. No. 5,384,144 to Bedard et al.

Additional psyllium containing pastas and methods for their manufacture are desirable.

It is therefore a principal object of this invention to provide for an effective and economically produced food composition comprising psyllium in a pasta product.

It is a further object of this invention to provide for a pasta composition containing psyllium which is palatable and suitable for human consumption in a food product while providing the health benefits associated with psyllium.

SUMMARY OF THE INVENTION

This invention provides for a pasta food product enriched with ultra-fine psyllium, that is the psyllium comminuted to a fine particle size range which renders it dispersible in a pasta dough, yielding an organoleptically acceptable pasta. Methods for making the psyllium containing pasta are also disclosed herein.

DETAILED DESCRIPTION OF THE INVENTION

It has been discovered that new psyllium ground to an ultra-fine powder may be easily blended with other pasta ingredients to yield an excellent pasta.

Ultra-fine psyllium is defined herein as psyllium having a particle size such that at least 99% by weight has a particle size of 75 microns or less. Preferably, the psyllium has a particle size distribution as follows:

|  | Sieve Size | | Sieving Time | Vacuum Press. | Sample Weight | | Percent Pass Through | |
|---|---|---|---|---|---|---|---|---|
|  |  |  |  |  | Before | After | Cum. | Diff. |
|  | [Micron] | [Mesh#] | [secs] | [In.H2O] | [g] | [g] | [%] | [%] |
| #1 | 25 | 500 | 120 | 24.8 | 10.00 | 1.97 | 80.30 | 80.30 |
| #2 | 32 | 450 | 120 | 23.9 | 1.97 | 0.62 | 93.80 | 13.50 |
| #3 | 38 | 400 | 120 | 24.9 | 0.62 | 0.42 | 95.80 | 2.00 |
| #4 | 45 | 325 | 120 | 24.8 | 0.42 | 0.36 | 96.40 | 0.60 |
| #5 | 53 | 270 | 120 | 23.4 | 0.36 | 0.23 | 97.70 | 1.30 |
| #6 | 63 | 230 | 120 | 23.1 | 0.23 | 0.16 | 98.40 | 0.70 |
| #7 | 75 | 200 | 120 | 25.0 | 0.16 | 0.14 | 98.60 | 0.20 |
| #8 | 90 | 170 | 120 | 24.6 | 0.14 | 0.09 | 99.10 | 0.50 |

The particle size distribution in the foregoing table was prepared using a Micron Air Jet Sieve. Use of ultra-fine psyllium provides superior dough products having excellent taste and mouthfeel, and allows the use of simple, well-known manufacturing techniques without the need for additional processing of the psyllium such as used in prior art techniques. It is surprising that psyllium having such a small particle size can be effectively used in the production of foodstuffs, particularly in doughs, because it has previously been thought that psyllium having such a small particle size would present difficulties with water absorption and dispersibility and yield an unacceptably "gummy" product.

To prepare the products of the invention, the ultra-fine psyllium is added with any known pasta ingredients, e.g. semolina, flours of farinaceous grains, etc. along with water, which are mixed to form a dough. The pasta noodles are then extruded through an appropriate extruder according to known techniques and cut or formed to the appropriate shape and size. The pasta may either be blanched or dried and used to make a variety of pasta products.

It has also been discovered that incorporation of ultra-fine psyllium into the dough allows the extruder pressure to be decreased approximately 10 to 30% compared to a comparable pasta formulation without the ultra-fine psyllium. This phenomenon is attributed to the "slippery" nature of psyllium upon hydration. For example, typical extruder pressures for semolina based pasta are in the range of 1000 to 1500 pounds per square inch (psi). A similar formula containing 5% ultra-fine psyllium by weight can be extruded at pressures of 800 to 1000 psi. This is advantageous because it reduces hazards to workers and decreases physical wear on the extruder.

The pasta of the invention can be prepared in any shape desired, e.g., fettuccini, elbow noodles, lasagna noodles, spaghetti, penne, raviolis, etc. They can then be dried, or blanched, and incorporated into various pasta meals.

The examples that follow are exemplary of pasta products that may be prepared in accordance with the present invention.

EXAMPLES 1 TO 4

Pastas of a variety of shapes and sizes are prepared following procedure:

For each of the following examples 1–4 the pasta was prepared as follows: Semolina and water were metered into a high sheer auger in order to hydrate the flour. The hydrated mix was then transferred to a paddle mixer where the ultra-fine psyllium was metered in via a vibratory screw feeder. The ultra-fine psyllium and semolina feeders are interlocked to assure proper psyllium addition. For fettuccine, the flour mixture was fed into an extruder with two heads in parallel. Each head had two rows that produce 70 strands of pasta per row. Extruder settings were adjusted to appropriate levels for producing the pasta dough. A time delay was set for a knife at the extruder to adjust for proper product length. As the knife cut the strands of wet pasta, the strand folded over a "stick" producing four sticks per cut (two per extruder head). The strands were cut off to an even length and the trim recycled to the paddle mixer. For elbow macaroni, the extrusion process was similar, but product was cut to the short goods length at the exist of the extruder.

In order to achieve a final moisture of 10–12%, the sticks were conveyed through a dryer. The total drying time was approximately 14–16 hours. The dryer used had two sections. In the first section, temperature is controlled. In the second section, the dryer contains two zones. The first zone is steam heated and the humidity and temperature are adjusted to achieve a 13.5–14.5% moisture of the pasta at this stage. The second zone is humidity controlled and is used as a relaxation period before final processing.

At the exit of the dryer, the strands are stripped from the sticks and cut to finished length.

For elbow macaroni, the extrusion and drying process was similar to fettuccini; however, this product was cut to finished length at the exit of the extruder and required a shorter drying process. The dough composition is set forth in the table below:

TABLE 1

| Ingredients | Grams |
|---|---|
| Semolina | 95.05 |
| Psyllium | 4.50 |
| Total | 99.55 |

A similar formula was used to make a ravioli, except that after extrusion the dough was formed into ravioli using a cheese based filling and a ravioli maker. The ravioli pasta dough contained 70 to 75% semolina flour, 0.97% ultra-fine psyllium and 24 to 29% water. The overall ravioli formula is set forth in more detail in Table 3 below.

Frozen entrees including the pasta were made with pastas made in accordance with the present invention. The entrees are produced in an assembly line fashion using conventional techniques known to those skilled in the art. The formulations of the entrees are set forth in the tables that follow:

EXAMPLE 1

TABLE 2

| Linguini with Marinara Ingredients | Grams |
|---|---|
| Water | 35.89 |
| Semolina Flour #1 | 22.15 |
| Tomato diced | 20.86 |
| Tomato crushed | 8.50 |
| Parmesan cheese grated | 5.00 |
| Onions, diced | 1.76 |
| Canola oil | 1.72 |
| Psyllium, ultra-fine | 1.21 |
| Olive Oil | 0.64 |
| Thermo-flo | 0.44 |
| Vinegar, red wine | 0.40 |
| Salt | 0.37 |
| Garlic, fresh | 0.26 |
| Base, chix 0800 | 0.24 |
| Sugar | 0.20 |
| Wine, sherry | 0.17 |
| Durem | 0.05 |
| Basil | 0.04 |
| Oregano | 0.04 |
| Black Pepper | 0.02 |
| Rosemary | 0.01 |
| Thyme | 0.01 |
| Total | 99.98 |

EXAMPLE 2

TABLE 3

| Four Cheese Lasagna Ingredients | Grams |
|---|---|
| Water | 42.27 |
| Semolina Flour #1 | 18.15 |
| Tomato diced | 10.33 |
| Ricotta cheese | 8.60 |
| Tomato paste | 6.58 |
| Moz lite frigo | 3.26 |
| Red bell peppers | 2.82 |
| Diced onions | 1.41 |
| Psyllium, ultra-fine | 1.21 |
| Asiago cheese shredded | 0.85 |
| Parmesan cheese grated | 0.85 |
| Thermflo | 0.85 |
| Milk solids | 0.75 |
| Garlic, fresh chopped | 0.56 |
| White vinegar | 0.54 |
| Salt | 0.35 |
| Basil ground | 0.06 |
| Parsley flakes | 0.05 |
| Garlic | 0.03 |
| Onion | 0.03 |
| Oregano ground | 0.03 |
| Oregano whole | 0.02 |
| Basil leaf whole | 0.02 |
| Black pepper | 0.01 |
| Pepper black dustless | 0.01 |
| Thyme whole | 0.01 |
| Total | 99.65 |

EXAMPLE 3

TABLE 4

| Fettuccine Primavera Ingredients | Grams |
|---|---|
| Water | 46.82 |
| Semolina Flour #1 | 21.61 |
| Broccoli cuts | 6.87 |
| Mid American parm cheese | 5.86 |
| Yellow squash | 4.12 |
| Shoestring carrots | 3.92 |
| Chopped spinach | 1.96 |
| Milk, nfd loheat | 1.90 |
| Base, parmesan eatem | 1.79 |
| Vegetable oil | 1.69 |
| Psyllium, ultra-fine | 1.19 |
| Starch | 0.73 |
| Flavor, cheese A | 0.65 |
| Flavor, cheese B | 0.23 |
| Sodium citrate dihydrate | 0.19 |
| Flavor, butter | 0.12 |
| Flavor, enhancer | 0.11 |
| Pepper, black ground | 0.03 |
| Total | 99.79 |

EXAMPLE 4

TABLE 5

| Fettuccine Alfredo Ingredients | Grams |
|---|---|
| Water | 59.00 |
| Semolina Flour #1 | 21.80 |
| Mid American Parm cheese | 8.23 |
| Milk nfd loheat-Michigan | 2.66 |
| Base, parmesan eatem | 2.52 |
| Vegetable oil | 1.69 |
| Psyllium, ultra-fine | 1.19 |
| Starch | 1.02 |
| Flavor chse net wonf A | 0.91 |
| Flavor chse net wonf B | 0.33 |
| Sodium citrate dihydrate | 0.27 |
| Flavor, butter | 0.16 |
| Flavor, enhancer | 0.16 |
| Pepper, black ground | 0.05 |
| Total | 99.99 |

In each example, the pasta was prepared from the ultra-fine psyllium and semolina in accordance with the method described herein.

The amount of ultra-fine psyllium incorporated into a pasta product may vary from about 1.0 gm to about 6.0 gms per two ounces of pasta. The preferred range of ultra-fine psyllium is from about 1.5 gms to about 4.0 gms per two ounces of pasta product.

It is preferred to use one of the standard flours used in the manufacture of pastas for the invention described herein. These include semolina flour, which is preferred, durum flour, farina flour, and all purpose flour, as well as any and all combinations of these. Also encompassed by the invention are those pasta products intended for those with wheat or gluten allergic, including pastas based on corn flour, Jerusalem artichoke flour, and other non-wheat based products.

Flavor components, i.e., tomato, parsley, calamari, lemon, garlic, curry, carrot, porcini, mushroom, black pepper, beet, onion, basil, ginger, saffron, lime, sage, spinach, dill, cilantro, serrano, green pepper, tarragon and combinations thereof, can also be added to the pasta product of the present invention, as can colors, eggs or egg components, and other seasonings, preservatives, and so forth.

The pasta product may include products such as described above but may also include spaghetti, vermicelli, macaroni, linguini, Chinese or Japanese noodles, and buckwheat noodles.

These products may include so-called "fresh" pastas, as well as dried pastas, the latter being especially preferred. The dried pastas are expected to have a shelf life equivalent to pasta products which do not contain psyllium. Examples of dried pastas are set forth below:

EXAMPLES 5 AND 6

Two dry pastas were prepared using the process described above for Examples 1–4. The ingredients are set forth below:

TABLE 6

| Fettuccine (Ex. 5) and Elbow Macaroni (Ex. 6) | |
| --- | --- |
| Ingredients | For 100# F.F. |
| Semolina | 95.05 |
| Psyllium | 4.50 |
| Total | 99.55 |

A macaroni and cheese entree was then prepared with the elbow macaroni of Example 6:

EXAMPLE 7

TABLE 7

| Macaroni and Cheese Ingredients | For 100# F.F. |
| --- | --- |
| Water | 61.77 |
| Semolina Flour #1 | 23.65 |
| Cheese powder | 3.82 |
| Milk | 2.17 |
| Cheese flavor | 1.64 |
| Cheese powder | 1.32 |
| Psyllium, ultra-fine | 1.29 |
| Thermflo | 1.19 |
| Margarine Solids | 1.19 |
| Flour Rice, sweet waxy | 0.85 |
| Flavor Enhancer | 0.42 |
| Heavy Cream | 0.39 |
| Whey powder | 0.26 |
| White Pepper | 0.03 |
| Durem | 0.00 |
| Total | 38.22 |

The entree had excellent taste and mouthfeel.

It is expected that consumption of a sufficient amount of pasta according to the invention to provide an amount of psyllium corresponding to the RACC will produce lowered serum cholesterol levels.

It is believed that other ingredients may be added to the pasta product without departing from the spirit and scope of the invention. Further, it is not intended that the present invention be limited to only the described embodiments. Modification of these embodiments will be recognized by those skilled in the art. Rather, the invention should be circumscribed by the scope of the appended claims.

It is claimed:

1. Psyllium enriched pasta comprising:

from 80–99% by weight pasta flour from 1 to 20% by weight of dry psyllium having a particle size such that at least 95% by weight is less than 38 microns, and water.

2. The pasta product of claim 1, wherein at least 80% of the dry psyllium by weight has a particle size of less than 25 microns.

3. The pasta product of claim 1, wherein the pasta is in a form selected from the group consisting of fettuccini, linguini, elbow noodle, spaghetti, lasagna and penne.

4. A method of preparing psyllium pasta product comprising:

admixing dry psyllium having a particle size such that at least 95% by weight is less than 38 microns with pasta flour that has been pre-hydrated with water to produce a dough; and shaping the dough to yield the desired pasta.

5. An entree comprising the psyllium enriched pasta of claim 1 and at least one flavoring agent.

* * * * *